Patented June 21, 1932

1,863,662

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DERIVATIVES OF MONOAMINODIBENZOPYRENEQUINONE

No Drawing. Application filed July 20, 1929, Serial No. 379,866, and in Germany July 26, 1928.

The present invention relates to new derivatives of monoamino-3.4.8.9-dibenzopyrene-5.10-quinones.

We have found that monoamino derivatives of 3.4.8.9-dibenzopyrene-5.10-quinone and its derivatives are valuable intermediate products for the preparation of new dyestuffs due to the reactivity of the hydrogen atoms of the amino group, one or both of the hydrogen atoms being readily replaced by organic radicles by condensation of the said amino derivatives with organic compounds containing a negative substituent. The expression organic compounds containing a negative substituent when used in the following description, is meant to comprise halogen compounds, nitro compounds and carboxylic acids and the halides and aldehydes derived from carboxylic acids of aliphatic, cycloaliphatic, aromatic and heterocyclic compounds. In the said aromatic compounds the negative substituent may be attached to the nucleus, as, for example, in chlorobenzene, chloroanthraquinone or nitronaphthalene, or to a side chain, such as, for example, in benzylchloride, benzalchloride benzotrichloride or naphthalene carboxylic acid halides. Such aromatic compounds may also be used as contain a negative substituent in the nucleus and in a side chain, such as, for example, nitrobenzoylchloride, nitroanthraquinonecarboxylicacidhalides. When employing aromatic compounds containing the negative substituent in the nucleus or in a hydrocarbon side chain, amines are obtained and when starting with such of the said compounds as contain the negative substituent attached to an acid group, imides are produced. In aromatic compounds containing negative substituents in the nucleus and in a side chain, the negative substituent in the side chain reacts first. By employment of aliphatic compounds containing a negative substituent, such as for example, methyliodide, ethylchloride, ethylenebromide, the alkyl esters of toluenesulphonic acid and the like, monoamino-3.4.8.9-dibenzopyrene-5.10-quinones alkylated on the nitrogen atom are produced. Organic compounds containing only a single or several negative substituents may be used, in the latter case several molecular proportions of the said monoaminodibenzopyrenequinones may be brought to reaction with one molecular proportion of the negatively substituted organic compound, for example, 2 molecular proportions of monoaminodibenzopyrenequinone may be condensed with 1 molecular proportion of terephthalylchloride, ethylene bromide, or p-dichlorbenzene, or in the case of cyanuryl chloride 3 molecular proportions of monoaminodibenzopyrenequinone. Preferably, high molecular organic compounds containing a negative substituent are condensed with the said monoaminodibenzopyrenequinones and with special advantage such as are capable of being vatted, for example, derivatives of anthraquinone, dibenzanthrone, pyranthrone, anthranthrone, dibenzopyrenquinones, anthraquinone-acridone, indigo and the like.

The production of the imines is preferably effected by heating the components in an organic medium in particular such of a high boiling point, for example nitrobenzene, naphthalene, trichlorobenzene and the like, acid-fixing agents, such as alkali metal acetates, carbonates and the like, and condensing catalysts, for example, such as copper, mercury, aluminium and the like or compounds thereof, such as their oxides and carbonates, being added, if desired. Preferably, only a single hydrogen atom of the amino group is replaced by the aforesaid organic radicles, the other remaining in the condensation product or being afterwards replaced by an alkyl radicle, preferably a methyl group.

The production of the imines in which the amino group is connected to the nuclei of aromatic compounds is often accompanied by simultaneous carbazolization of the said imines produced, in particular, when larger amounts of metal oxides are employed as condensing catalysts, or the condensation is carried out in diluting media having an oxidizing action such as nitrobenzene, or nitronaphthalene. Carbazolization may, however, also be performed subsequently in any known manner, for example, by treating the imines with aluminium chloride to which salts of alkali metals or alkaline earth metals may be added, chlorosulphonic acid, oleum and the like.

In the production of our new imides the condensation readily takes place in the absence of any diluting medium and condensing catalyst, in this case organic bases, such as for example pyridine, dimethylaniline, quinoline and choline, are preferably added as acid-fixing agents.

The following examples will further illustrate the nature of this invention, but the invention is not restricted to these examples. The parts are by weight.

Example 1

35 parts of monoamino-3.4.8.9-dibenzopyrene-5.10-quinone (obtainable by reduction of the corresponding nitro-compound prepared by treating dibenzopyrenequinone with a mixture of nitrobenzene and nitric acid) are suspended in 1000 parts of nitrobenzene and heated to boiling for a short time after the addition of 100 parts of benzoyl chloride. The whole is then allowed to cool and the monobenzoylaminodibenzopyrenequinone corresponding to the formula:

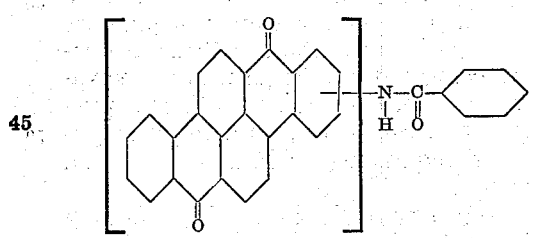

which separates in the form of copper red needles, is isolated in the usual manner. It dissolves in concentrated sulphuric acid to give a violet coloration and gives extremely clear strong orange red dyeings of extraordinary fastness on cotton from a red vat.

By employing m-methoxybenzoyl chloride instead of benzoyl chloride in the above example a somewhat more red dyestuff is obtained which has similar properties of fastness.

Example 2

35 parts of the monoaminodibenzopyrenequinone obtainable as described in Example 1 are suspended in 1250 parts of nitrobenzene; 31 parts of 1-chloranthraquinone-2-carboxylic acid chloride are then added and the whole heated for a short time to from 190° to 205° C. The whole is allowed to cool and the reaction product is filtered off by suction. The dyestuff corresponding to the formula:

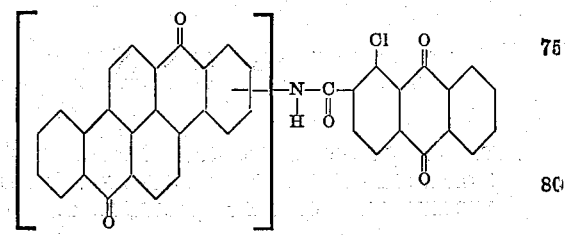

is obtained as a red powder, crystallizes in fine needles, dissolves in concentrated sulphuric acid to give a violet coloration and dyes cotton in orange shades of very good fastness from a blue red vat.

Example 3

A suspension of 35 parts of the monoaminodibenzopyrenequinone obtainable as described in Example 1, 25 parts of 1-chloranthraquinone, 30 parts of sodium acetate and 7 parts of copper oxide in 500 parts of nitrobenzene is boiled while stirring until the reaction product is practically free from chlorine. After cooling the reaction product corresponding to the formula:

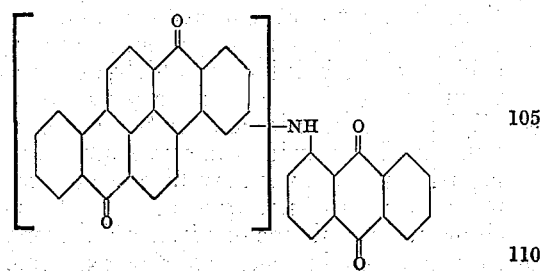

is isolated by filtration by suction, or by steam distillation. It is a brown powder which dissolves in concentrated sulphuric acid to give a violet coloration and which gives very fast orange brown dyeings from a brown red vat.

Example 4

105 parts of monoamino-3.4.8.9-dibenzopyrene-5.10-quinone are heated to 150° C. while stirring in 1500 parts of nitrobenzene after the addition of 18.5 parts of cyanuryl chloride, 1.5 parts of copper oxide and 15 parts of sodium acetate and kept at the said temperature until unchanged initial material cannot any more be detected. The reaction mixture is then allowed to cool and worked up in the usual manner. The reaction product corresponding to the formula:

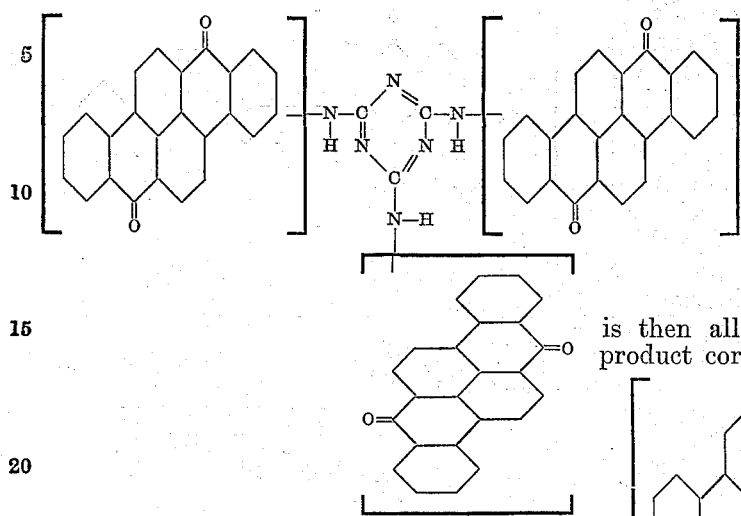

is obtained in a very good yield in the form of red-brown crystals. It dissolves in concentrated sulphuric acid to give a blue red solution and dyes cotton from a red vat strong red-brown shades of very good fastness properties in particular as regards fastness against washing and bucking. The crude dyestuff may be purified, if desired by treating it with oxidizing agents, for example, by treating its aqueous paste with a solution of a hypochlorite. The reaction product may also be subsequently alkylated according to known methods.

By condensation of the monoaminodibenzopyrenequinone with 2.4-dichloroquinazoline or other heterocyclic compounds containing negative substituents dyestuffs of similar properties as regards fastness are obtained.

*Example 5*

35 parts of monoamino-3.4.8.9-dibenzopyrene-5.10-quinone are boiled for several hours in 1000 parts of nitrobenzene, the mixture being then allowed to cool to 100° C. 35 parts of 1-aminoanthraquinone-2-carboxylic acid chloride are then introduced and the whole stirred at between 100 and 110° C. until unchanged aminodibenzopyrenequinone cannot any more be detected. The reaction is then allowed to cool and the reaction product corresponding to the formula:

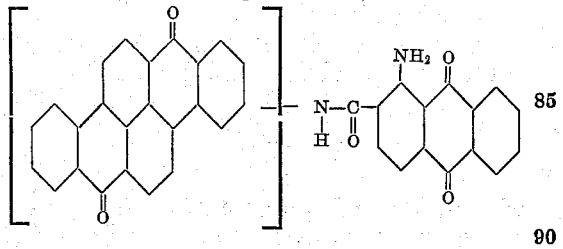

recovered in the usual manner. It is a red crystalline powder, dissolves in concentrated sulphuric acid to give a violet solution and dyes cotton remarkably fast strong brick-red shades from a red vat.

The condensation product obtained in an analogous manner from 1-nitroanthraquinone-2-carboxylic acid chloride and monoaminodibenzopyrenequinone furnishes the same dyeings.

*Example 6*

350 parts of monoamino-3.4.8.9-dibenzopyrene-5.10-quinone are suspended while stirring in 5000 parts of nitrobenzene. 35 parts of the dichloride of oxalic acid are then added to the suspension at ordinary temperature, the reaction mixture stirred at the said temperature for several hours and is then slowly warmed at 100° C., kept at the said temperature for some time and then heated to boiling. After all the initial material has been consumed, the reaction mixture is allowed to cool and the reaction product forming yellow orange crystals filtered by suction. The reaction product corresponding to the formula:

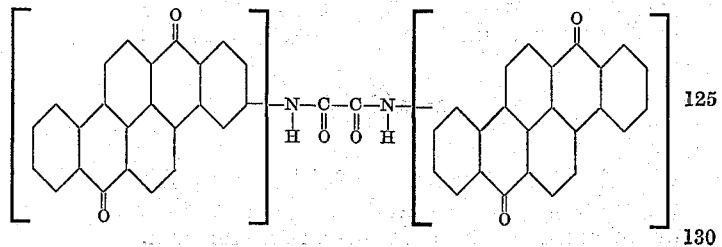

dissolves in concentrated sulphuric acid to give a violet solution and dyes cotton from a blue-red vat very fast yellow shades with a reddish tinge. The crude dyestuff can, if desired, be purified according to known methods, for example, by treating it with a solution of a hypochlorite.

When starting from derivatives of the monoaminodibenzopyrenequinone the corresponding ethylamino derivatives are obtained in an analogous manner. The chlorides of other mono- or polybasic carboxylic acids, such as, for example, the chlorides of malonic acid, succinic acid, thiophosgene and the like react in a similar manner.

What we claim is:

1. As new articles of manufacture vat dyestuffs corresponding to the general formula:

$$R-N<^X_Y$$

wherein R stands for a 3.4.8.9-dibenzopyrene-5.10-quinone radicle, X for a radicle of an organic compound capable of being vatted and Y for hydrogen or an alkyl radicle.

2. As new articles of manufacture vat dyestuffs corresponding to the general formula:

$$R-N<^X_H$$

wherein R stands for a 3.4.8.9-dibenzopyrene-5.10-quinone radicle and X for a radicle of an organic compound capable of being vatted.

3. As new articles of manufacture vat dyestuffs corresponding to the general formula:

$$R-N<^X_H$$

wherein R stands for a 3.4.8.9-dibenzopyrene-5.10-quinone radicle and X for a residue of an anthraquinone body.

4. As new articles of manufacture vat dyestuffs corresponding to the general formula:

$$R-N<^X_H$$

wherein R stands for a 3.4.8.9-dibenzopyrene-5.10-quinone radicle and X for a radicle of an anthraquinone-carboxylic acid.

5. As new articles of manufacture vat dyestuffs corresponding to the general formula:

$$R-N<^X_H$$

wherein R stands for a 3.4.8.9-dibenzopyrene-5.10-quinone radicle and X for a radicle of an amino-anthraquinone-carboxylic acid.

6. As a new article of manufacture the vat dyestuff corresponding to the formula:

[structural formula]

forming a red powder, dissolving in concentrated sulphuric acid to give a violet coloration and dyeing cotton from a blue vat orange shades.

In testimony whereof we have hereunto set our hands.

MAX ALBERT KUNZ.
KARL KOEBERLE.
ERICH BERTHOLD.